United States Patent
Prskawetz et al.

(10) Patent No.: US 9,008,905 B2
(45) Date of Patent: Apr. 14, 2015

(54) WINDSCREEN WIPER DRIVE CONTROL SYSTEM AND METHOD

(75) Inventors: Philipp Prskawetz, Bietigheim (DE); Florian Tisch, Renchen-Ulm (DE); Edgard Fabing, Bining (FR)

(73) Assignee: Robert Bosch GmbH, Stuttgart (DE)

( * ) Notice: Subject to any disclaimer, the term of this patent is extended or adjusted under 35 U.S.C. 154(b) by 243 days.

(21) Appl. No.: 13/395,911

(22) PCT Filed: Jul. 22, 2010

(86) PCT No.: PCT/EP2010/060595
§ 371 (c)(1),
(2), (4) Date: Mar. 14, 2012

(87) PCT Pub. No.: WO2011/032756
PCT Pub. Date: Mar. 24, 2011

(65) Prior Publication Data
US 2012/0173077 A1   Jul. 5, 2012

(30) Foreign Application Priority Data

Sep. 15, 2009   (DE) .......................... 10 2009 029 457

(51) Int. Cl.
*G06F 7/00* (2006.01)
*B60S 1/08* (2006.01)

(52) U.S. Cl.
CPC ................................. *B60S 1/0814* (2013.01)

(58) Field of Classification Search
None
See application file for complete search history.

(56) References Cited

U.S. PATENT DOCUMENTS

| 5,493,190 A | * | 2/1996 | Mueller ......................... 318/443 |
| 6,567,476 B2 | * | 5/2003 | Kohl et al. ..................... 375/293 |
| 2009/0016216 A1 | * | 1/2009 | Ballard et al. ................. 370/230 |
| 2009/0125183 A1 | | 5/2009 | Amagasa et al. |

FOREIGN PATENT DOCUMENTS

| EP | 1447287 | 8/2004 |
| EP | 1447288 | 8/2004 |

OTHER PUBLICATIONS

PCT/EP2010/060595 International Search Report dated Oct. 1, 2010 (Translation and Original—4 pages).

* cited by examiner

*Primary Examiner* — Thomas Tarcza
*Assistant Examiner* — Adam Alharbi
(74) *Attorney, Agent, or Firm* — Michael Best & Friedrich LLP

(57) ABSTRACT

The invention relates to a drive control means, in particular for controlling a windscreen wiper drive of a motor vehicle, having a first interface and a second interface, wherein, after receiving control information via the first interface, the drive control means is arranged to configure itself in a master role and to output control information via the second interface in order to control a further drive control means.

10 Claims, 4 Drawing Sheets

WINDSCREEN WIPER DRIVE CONTROL SYSTEM AND METHOD

BACKGROUND OF THE INVENTION

The invention relates to a drive control means, in particular for controlling a windscreen wiper drive of a motor vehicle.

Motor vehicles have windscreen wipers in order to clear moisture and dirt from the window panes of the motor vehicle. A windscreen wiper comprises a drive, a wiper arm and a wiper blade. The drive transmits an oscillating movement to the wiper arm, which guides the wiper blade across the window pane. Windscreens of passenger cars are normally equipped with two adjacent wipers. In order to avoid a mechanical connection between the wiper arms of both windscreen wipers, each windscreen wiper can have its own drive associated therewith, wherein the drives are synchronized in order to prevent a collision of the wiper arms or respectively the wiper blades and in order to maintain a predetermined sequence of movement of the windscreen wipers. Each of the drives comprises a control means associated therewith. Depending upon the configuration of the entire windshield wiper system, one of the control means in the role of the "master" defines the movement to be performed by both of the wiper arms and transmits certain items of movement information to the other control means, which in the role of the "slave" follows this lead. Both control means furthermore control the drives associated with them.

The aim of the invention is to provide a drive control means, which allows for a dynamic association of the roles in a two wiper system.

SUMMARY OF THE INVENTION

According to the invention, a drive control means comprises a first and a second interface, in particular to control a windscreen wiper drive of a motor vehicle. If the drive control means receives control information via the first interface, said means configures itself in the master role and outputs control information via the second interface. If, on the other hand, the drive control means receives only data via the second interface, said means can then configure itself in the slave role. Two such drive control means, the respective second interfaces of which are connected to one another, are located in a control system for two windscreen wipers of a motor vehicle.

In order to equip or provide a motor vehicle with windscreen wiper systems or replacement parts, it is consequently no longer required to differentiate between different drive control means. Management, storage and production costs can therefore be saved. Moreover, it is readily possible to change an existing distribution of the master or slave roles onto two drive control means by removing the connection of the control module to the first interface of one of the drive control means and connecting it instead to the first interface of the other drive control means.

The drive control means can configure itself as slave in the event that no control information could be received via the first interface over a predetermined period of time. As a result, a configuration of a plurality of drive control means as master in a system, which can lead to operational malfunctions, is unlikely. The configuration as master or as slave can be reversed by control information being received via the first interface, which if need be triggers a new configuration of the drive control means, parallel to an operation in the respective role. This increases a configuration speed and allows the drive control means to be more easily managed.

The drive control means can be configured to exchange control information, which comprises a target position and an actual position of a drive that is connected to one of the drive control means, via the second interface. In so doing, the drive control means configured as master can transmit a target position and receive an actual position. A collision detection can, for example, be implemented using this information if one of the wiper arms meets resistance and continues operation at a reduced speed or stops. The drive control means configured as master can resolve such a collision by allowing one or both of the drives to run in a predetermined sequence and at a predetermined speed in a suitable direction.

The drive control means can access at least two stored characteristic curves and in a configuration in the master role control the drive according to a first characteristic curve and in a configuration in the slave role according to a second characteristic curve. The characteristic curves define a temporal course of a movement of the drive or respectively the wiper arm. A characteristic course of movement of a drive connected to the drive control means can therefore vary depending upon whether said drive control means is configured as master or as slave. This allows for an interaction in the course of movement of the drives to change by reconfiguring the master and slave roles. In addition, a communication complexity between two drive control means is minimized by the local processing of characteristic curves.

The drive control means can be arranged to configure itself as slave in cases of doubt, for instance after receiving control information via the first as well as the second interface. Mechanical and data collisions can thereby be avoided if both drive control means try to assume the master role.

If the drive control means does not receive any control information via one of the interfaces thereof over a predetermined period of time, said means can bring a drive associated therewith into a park position. If an error occurs, said means can prevent the drive from remaining in a position where it disrupts the operational dependability of the motor vehicle or where it represents a potential obstacle for the second drive.

According to a further aspect, the invention comprises a method for controlling two drives, with which a drive control means is associated in each case. A first drive control means receives control information via a first interface and thereupon outputs control information to a second drive control means via the second interface thereof. Each drive control means controls a drive associated therewith.

BRIEF DESCRIPTION OF THE DRAWINGS

The invention is now explained in detail while making reference to the accompanying figures, in which.

DETAILED DESCRIPTION

Figure 1:
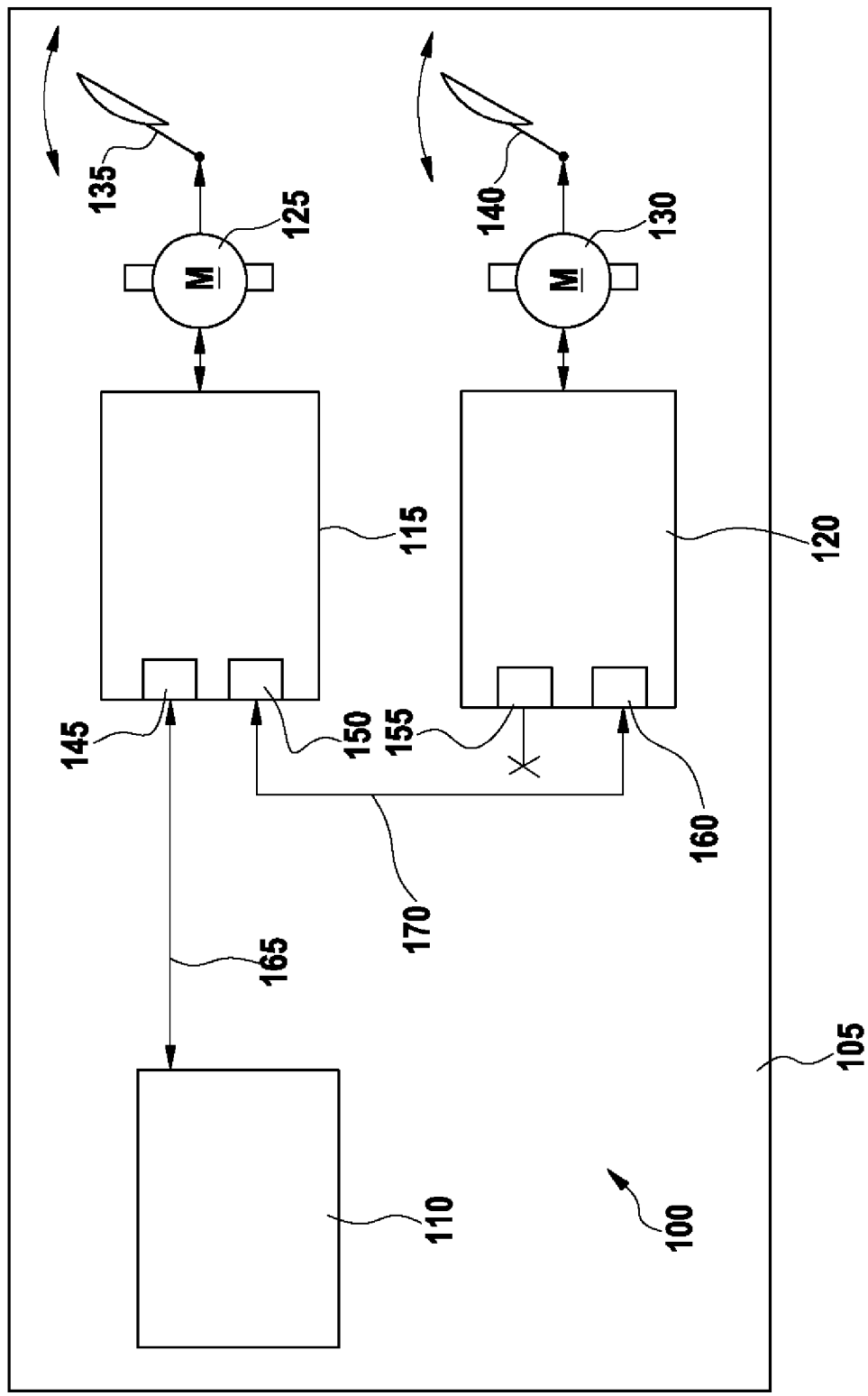
FIG. 1 shows a control system for windscreen wipers of a motor vehicle.

FIG. 1 shows a control system 100 for windscreen wipers in a motor vehicle 105. The control system 100 comprises a control module 110, a first drive control means 115 and a second drive control means 120. A first drive 125 is associated with the first drive control means 115 and a second drive 130 is associated with the second drive control means 120. The first drive 125 operates a first wiper arm 135 and the second drive 130 operates a second wiper arm 140. Said first drive control means 115 comprises a first interface 145 and a second interface 150. Said second drive control means 120 comprises a first interface 155 and a second interface 160. The control module 110 is connected to a first interface 145 of said first drive control means 115 by means of a first connection 165. A second connection 170 runs from the second interface 150 of said first drive control means 115 to the second interface 160 of said second drive control means 120.

The control module 110 is a part of an electrical system of the motor vehicle 105 and communicates at regular intervals with the first drive control means 115. In so doing, information is exchanged irrespective of which operating state the first drive 125 and the second drive 130 assume. The items of information exchanged can include configuration, status and operating parameters. The first connection 165 can be part of a LIN bus. On the basis of information transmitted by the control module 110 via the first interface 145, for example items of control information, said first drive control means 115 recognizes that it is to be configured as master. Said first drive control means 115 thereupon controls the drive 125 associated therewith according to the information, which it receives via the first interface 145 thereof and sends via the second interface 150 thereof and the second connection 170 corresponding information to the second interface 160 of the second drive control means 120. Said second drive control means 120, the first interface 155 of which is not connected to any communication partner, recognizes by the absence of information via the first interface 155 thereof that it is to configure itself as slave. Said second drive control means thereupon evaluates information received via the second interface 160 thereof and controls the drive 130 associated therewith according to the information that has been received. The second connection 170 can, for example, be a Carline connection.

The drives 125 and 130 are direct current motors, which act on the wiper arms 135 and 140 by means of a gear mechanism. Sensors (not depicted) are attached to the drives or to the gear mechanisms in order to determine an actual movement or an absolute position of the wiper arms 135 or 140. The drive control means 115 and 120 are connected to these sensors and actuate said drives 125 or respectively 130 as a function of the information received from the sensors and via the interfaces 145 or respectively 160. Said drive control means 115 and 120 comprise in each case H-bridges (not depicted) for selecting a rotational direction of said drives 125 and 130. Said drive control means 115 and 120 can be designed as integral parts of said drives 125 or respectively 130.

Figure 2A:
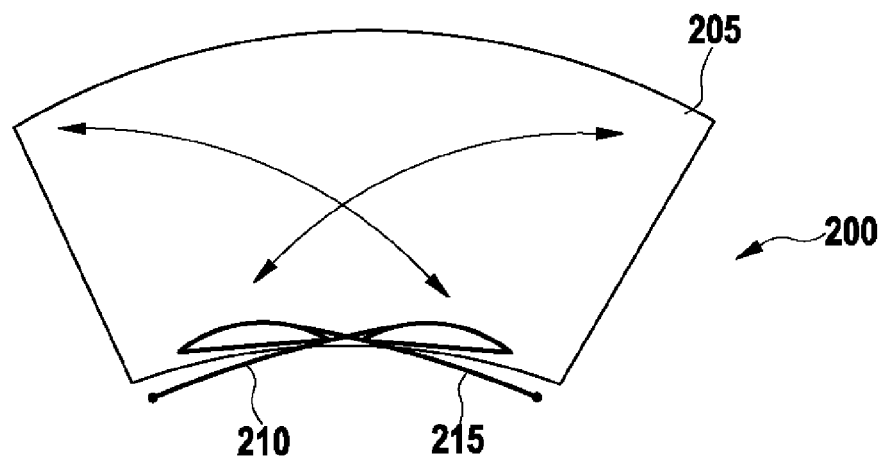
FIGS. 2a and 2b show windscreen wiper arrangements to be operated by means of the control system from FIG. 1.
Figure 2B:
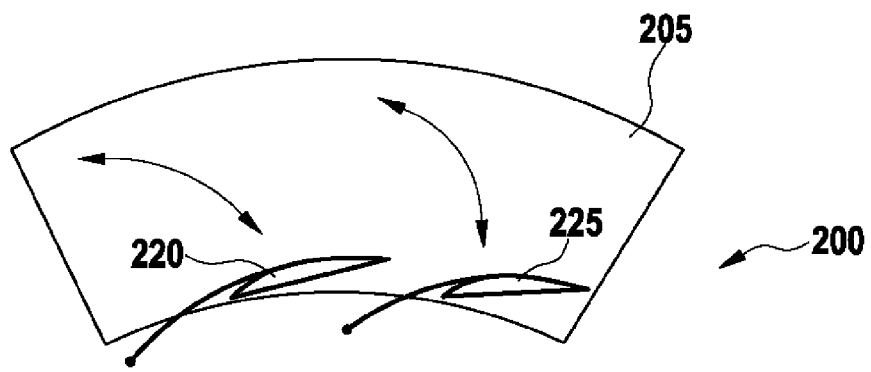

FIGS. 2a and 2b show two different windscreen wiper arrangements 200 of a motor vehicle for controlling by means of the control system 100 from FIG. 1. The stylized views of FIGS. 2 and 2a ensue from the interior of the motor vehicle 105. The windscreen wiper arrangement 200 comprises in each case a windscreen 205 of the motor vehicle 105 and in each case two windscreen wipers 210-225. Each windscreen wiper 210-225 comprises in each case a drive such as the drives 125, 130 in FIG. 1, a wiper arm such as the wiper arms 135, 140 from FIG. 1 and a wiper blade (without reference numeral).

In FIG. 2a, a right windscreen wiper 210 and a left windscreen wiper 215 are arranged to run in opposite directions, i.e. when the left windscreen wiper 210 is moved counterclockwise, the right windscreen wiper is then moved clockwise and vice versa. In a resting position depicted, that windscreen wiper 210, 215, which is associated with a driver's side of the motor vehicle 105, is staggered with the windscreen wiper 215, 210, which is assigned to a passenger side of said motor vehicle 105, in such a way that the driver's side windscreen wiper 210, 215 can also then be moved if the passenger's side windscreen wiper 215, 210 remains in the resting position thereof. In so doing, said driver's side windscreen wiper is assigned to the first drive control means 115, which is configured as master, so that an operation of said driver's side windscreen wiper 210, 215 is not dependent upon the operability of the drive control means 115, 120, which is configured as slave, or the windscreen wiper 215, 210 associated therewith. Depending upon whether the motor vehicle 105 is driven from the right or left side, the left widescreen wiper 210 or the right windscreen wiper 215 is connected to the first drive control means 115 which is configured as master. Park positions for each windscreen wiper 210, 215 are selected in such a way that vision through the wind screen 205 is obstructed as little as possible for an occupant of the motor vehicle 105 and at the same time a movement of the respective other windscreen wiper 210, 215 is possible without collision. This is the case for each windscreen wiper 210, 215 at both ends of the pivoting movement thereof.

The windscreen wiper arrangement 200 in FIG. 2b comprises a left windscreen wiper 220 and a right windscreen wiper 225, which vary in the position of their axes of rotation and their resting positions from the windscreen wipers 210 and 215 of FIG. 2a. The windscreen wipers 220 and 225 operate concurrently, i.e. they move substantially synchronously to each other with regard to their clockwise or counterclockwise direction of rotation. The position of the left windscreen wiper 220 already establishes the association thereof to the driver's side of the motor vehicle 105 because the portion of the windscreen 205 that is swept by said left windscreen wiper 220 corresponds to an optimal viewing window for a driver of the motor vehicle 105. An unswept first remaining portion of the windscreen 205 lies in the region of the center of said windscreen 205. The right windscreen wiper 225 is situated on the passenger's side of the motor vehicle 105, wherein an unswept second remaining portion of said windscreen 205 in the upper right corner thereof presents less of a problem for a passenger in the vehicle. The left windscreen wiper 220 is associated with the first drive control means 115 in FIG. 1, which is configured as master. Park positions also result here as previously described in reference to FIG. 2b.

Figure 3:
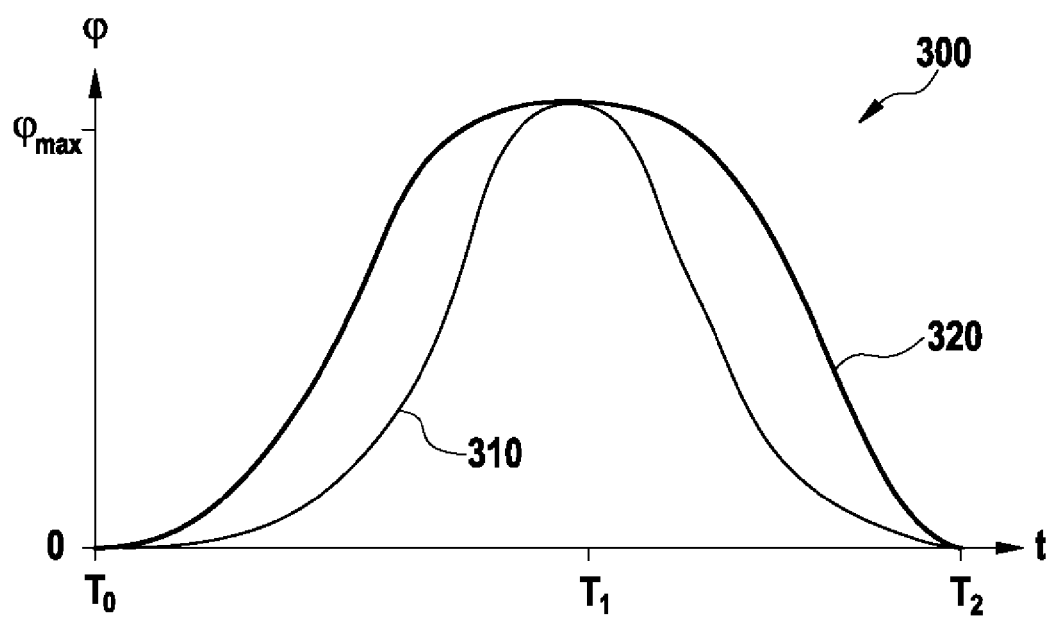
FIG. 3 shows a characteristic curve diagram comprising wiper characteristic curves of the drives of the control system from FIG. 1.

FIG. 3 shows a characteristic curve diagram 300 for drives 125 and 130 of the control system 100 from FIG. 1. Time is plotted in the horizontal direction and an angle of rotation N of the windscreen wipers 210, 215 of the windscreen wiper arrangement 200 in FIG. 2a or respectively of the wiper arms 135 and 140 of the control system 100 in FIG. 1 is plotted in a vertical direction. The angles of rotation correspond to deflections from resting positions and are specified as amounts. A first wiper characteristic curve 310 corresponds to the left windscreen wiper 210 in FIG. 2a, which is controlled by means of the first drive 125 of the first drive control means 115, which is configured as master. A second wiper characteristic curve 320 corresponds to the right windscreen wiper 215, which is controlled by means of the second drive 130 of the second drive control means 120, which is configured as slave.

At a point in time $T_0$, the angles of rotation N of the two wiper characteristic curves 310 and 320 are likewise 0. In a region between $T_0$ and $T_1$, the angle of rotation N of the second wiper characteristic curve 320 initially increases faster than that of the first wiper characteristic curve 310 up until the point in time $T_1$ where both wiper characteristic curves 310 and 320 reach the maximum angle of rotation $N_{max}$. In like fashion, both of said wiper characteristic curves 310 and 320 return again to 0 between $T_1$ and $T_2$. That means that said first wiper characteristic curve initially drops before said second wiper characteristic curve 320 drops.

The reason why the course of the first wiper characteristic curve 310 and the second wiper characteristic curve 320 do not match is based on the fact that the left windscreen wiper 210 in FIG. 2a has to be deflected by a certain amount before the right windscreen wiper 215 can be deflected without colliding with said left windscreen wiper 210. Said windscreen wipers 210 and 215 have achieved their maximum deflection $N_{max}$ if said left windscreen wiper 210 is maximally deflected in a counterclockwise direction and said right windscreen wiper 215 is maximally deflected in a clockwise direction. From this location a return movement of said windscreen wipers 210 and 215 proceeds accordingly, i.e. said right windscreen wiper 215 runs ahead of said left windscreen wiper 210 with regard to the angle of rotation thereof in order to facilitate a collision-free movement.

Figure 4:
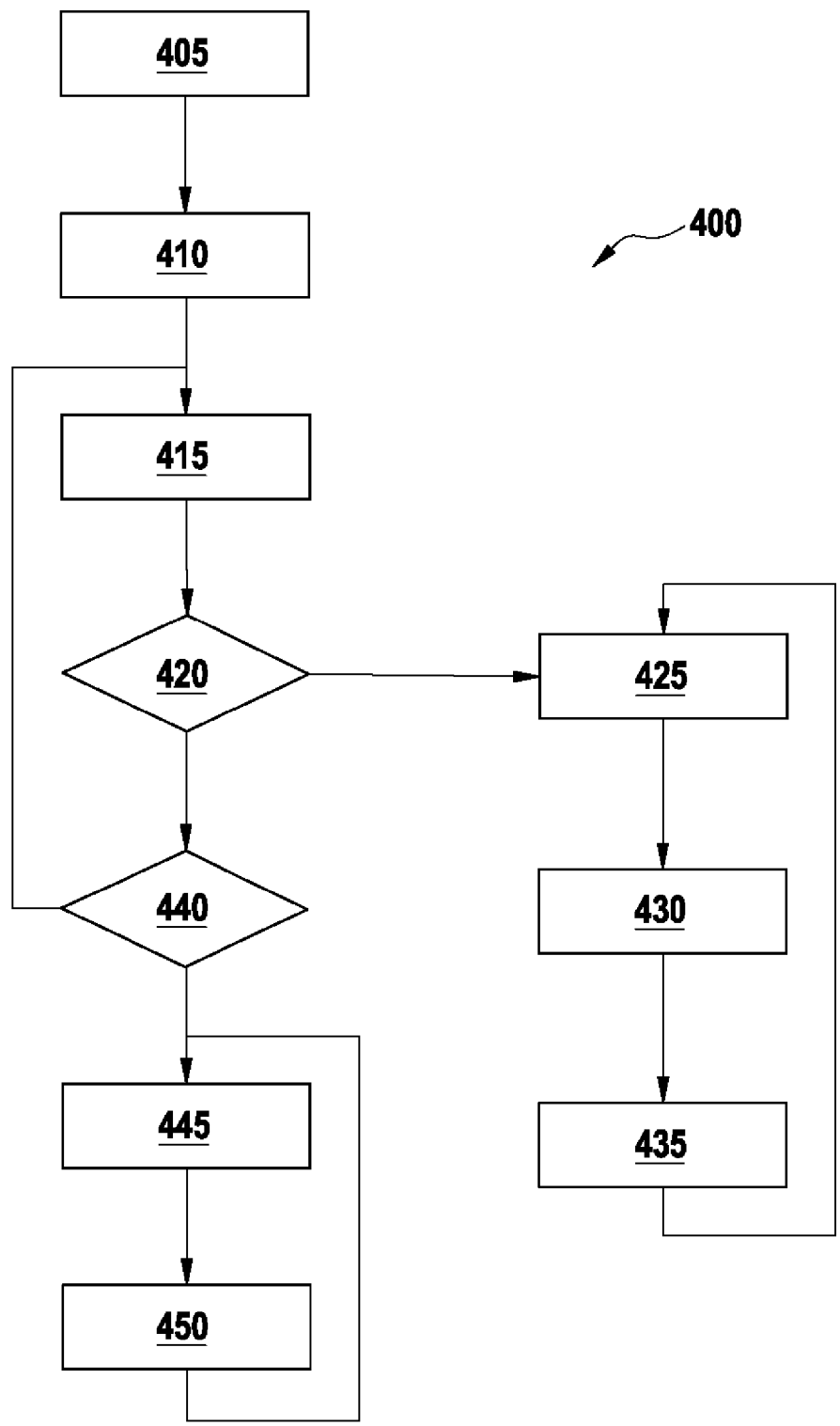
FIG. 4 shows a method for controlling the control system from FIG. 1.

FIG. 4 shows a method for controlling the drives 125 or respectively 130, which is to be carried out on the first drive control means 115 or respectively on the second drive control means 120 from FIG. 1. The method comprises the steps 405 to 450.

The method 400 is located in the starting state in step 405. In step 410 a timer is started in order to monitor a passing of a predetermined period of time. Control information is subsequently received in step 415 via the first interface 145 or respectively 155. A check is subsequently made in step 420 to determine whether control information is actually present. If this is the case, further items of control information are outputted via the second interface 150 or respectively 160 in the following step 425. In step 430, that drive 125, 130, which is associated with the drive control means in which the method 400 is executed, is controlled in accordance with the control information which was received via the first interface 145 or respectively 155. Further items of control information are thereupon received via the first interface 145 or respectively 155 and the method returns back to step 425.

If, however, it is determined in step 420 that no items of control information are present, a check is then made in step 440 to determine whether the timer has run down in the meantime. If this is not the case, the method continues with step 415 and receives further items of control information. Otherwise control information is received via the second interface 150 or respectively 160 in step 445. The drive 125, 130, which is associated with the drive control means 115, 120 in which the method 400 is executed, is subsequently controlled in step 450 according to the control information received via said interface 150 or respectively 160. Thereafter the method 400 returns to step 445.

The first infinite loop over the steps 425, 430 and 435 corresponds to a configuration of a drive control means 115 or 120 as master; whereas the second infinite loop over the steps 445 and 450 corresponds to a configuration as slave.

Other sequences are likewise possible, in particular those, which allow the infinite loops to be broken out of within the scope of a reconfiguration. To meet this end, steps for receiving data via the first interface and for checking received control information, said steps being analogous to steps 410-440, are run through within the loops. Additional procedural steps are, for example, possible within the scope of a collision resolution, an emergency operational sequence in the event that the individual components of the windscreen wiper system malfunction or within the scope of a method for moving into a park position.

The invention claimed is:

1. A control system (100) having
a first drive controller (115, 120) for controlling a windscreen wiper drive (125, 130) of a motor vehicle (105), the first drive controller (115, 120) having
a first interface (145, 155); and
a second interface (150, 160);
characterized in that after receiving control information via the first interface (145, 155), the drive controller (115, 120) configures itself in a master role and outputs control information via the second interface (150, 160) to control a second drive controller (115, 120).

2. The control system (100) according to claim 1, characterized in that the first drive controller (115, 120) configures itself in a slave role and is controlled by control information via the second interface (150, 160) after no control information has been received via the first interface (145, 155) for a predetermined period of time.

3. The control system (100) according to claim 1, characterized in that the first drive controller (115) configured as master outputs control information, which comprises a target position of a drive (130) connected to the second drive controller (120), via the second interface (150) and to receive control information which comprises an actual position of the drive (130).

4. The control system (100) according to claim 1, characterized in that the first drive controller (115, 120) controls a drive (125, 130) associated therewith in the master role based on a first stored characteristic curve (310, 320) and in the slave role based on a second stored characteristic curve (310, 320).

5. The control system (100) according to claim 1, characterized in that after receiving control information via the first interface (145, 155) as well as the second interface (150, 160), the first drive controller (115, 120) configures itself in a slave role and controls a drive (125, 130) associated therewith according to control information received via the second interface (150, 160).

6. The control system (100) according to claim 1, characterized in that the first drive controller (115, 120) brings a drive (125, 130) associated therewith into a park position after control information has neither been received via the first interface (145, 155) nor via the second interface (150, 160).

7. The control system (100) according to claim 1, further comprising
the second drive controller (120) has a first interface (145, 155); and a second interface (150, 160); and
a control module (10) which is connected to the first interface (145, 155) of the first drive controller (115),
wherein the second interfaces (150, 160) of both drive controllers (115, 120) are connected to one another;
wherein the first driver controller is configured as a master and is associated with a first drive, and the second driver controller is configured as a slave and is associated with a second drive; and
wherein the first drive controller can operate the first drive even when the second drive remains in a resting position.

8. The control system according to claim 7, characterized in that the first and the second drives (125, 130) are designed to work in opposite directions.

9. A method for controlling a first drive (125), with which a first drive controller (115) is associated, and a second drive (130), with which a second drive controller (120) is associated, characterized by the following steps:
- Receiving (415) control information via a first interface (145) of the first drive controller (115);
- Configuring the first drive controller (115) in a master role based on the control information received via the first interface (145);
- Configuring the second drive controller (120) in a slave role;
- Outputting (425) control information to the second drive controller (120) via a second interface (150) of the first drive controller (115);
- Controlling (430) the first drive (125) by the first drive controller (115); and
- Controlling (450) the second drive (130) by the second drive controller (120);
- wherein the second drive controller (120) is configured in the slave role in order to receive control information via the second interface (160) thereof after said second drive controller has not received any control information via the first interface (155) thereof for a length of time which exceeds a predetermined period of time.

10. The control system according to claim 7, characterized in that the control system is for two windscreen wipers of a motor vehicle (105).

* * * * *